J. E. BURGHOFF & J. B. WILKS.
COMB EMBOSSING AND CUTTING DIES.
APPLICATION FILED DEC. 14, 1910.
1,029,488.
Patented June 11, 1912.
2 SHEETS—SHEET 1.
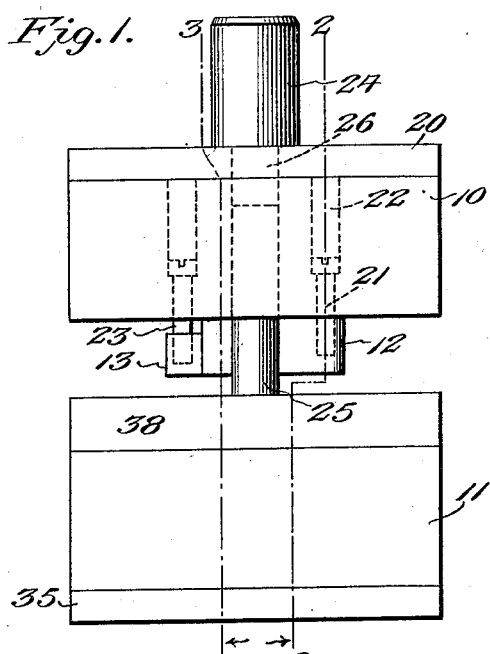
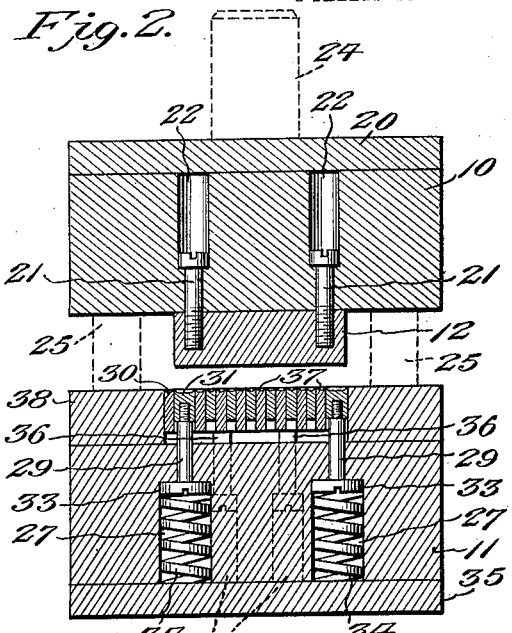
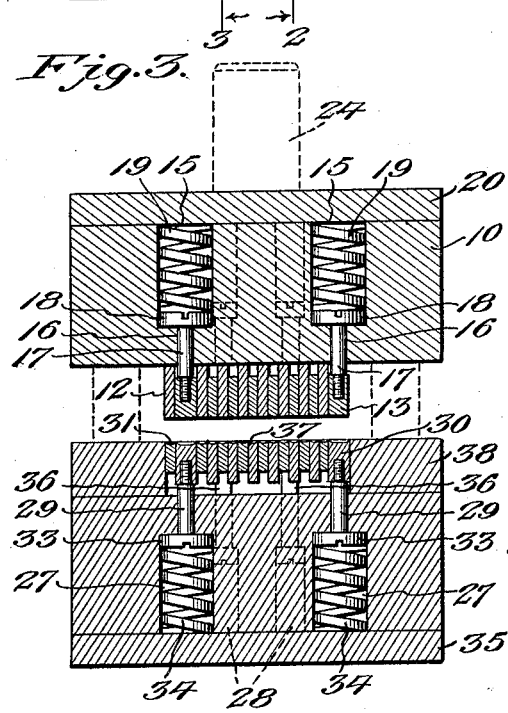
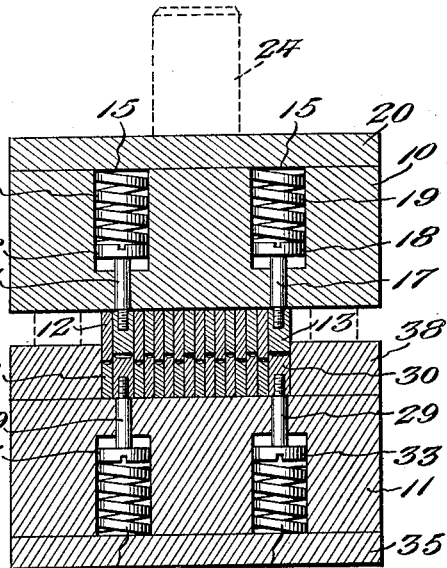
Witnesses
Edwin F. McKee
Inventors
John B. Wilks
John E. Burghoff
By Victor J. Evans
Attorney J. E. BURGHOFF & J. B. WILKS.
COMB EMBOSSING AND CUTTING DIES.
APPLICATION FILED DEC. 14, 1910.
1,029,488.
Patented June 11, 1912.
2 SHEETS—SHEET 2.
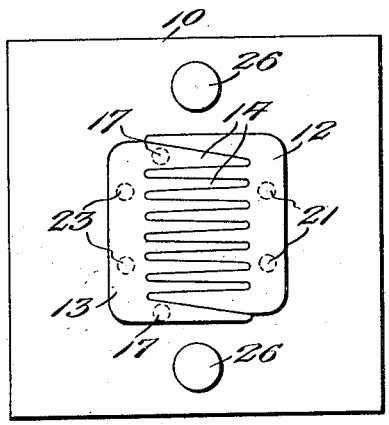
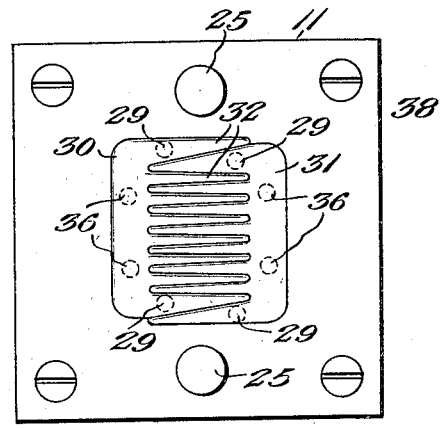
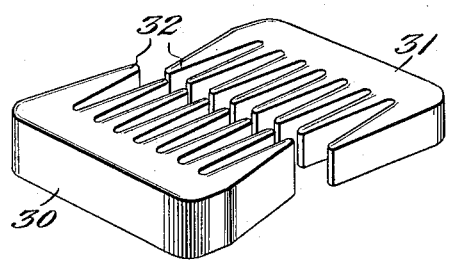
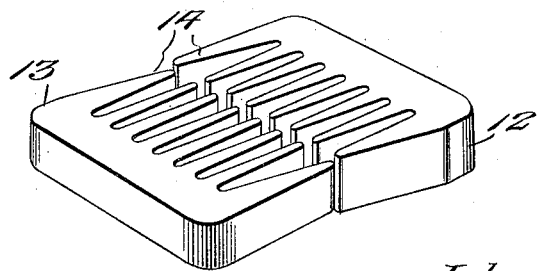
Witnesses
Edwin F. McKee
Inventors
John B. Wilks
John E. Burghoff
By Victor J. Evans
Attorney

UNITED STATES PATENT OFFICE.

JOHN E. BURGHOFF AND JOHN B. WILKS, OF LEOMINSTER, MASSACHUSETTS.

COMB EMBOSSING AND CUTTING DIES.

1,029,488.  Specification of Letters Patent.  Patented June 11, 1912.

Application filed December 14, 1910. Serial No. 597,305.

*To all whom it may concern:*

Be it known that we, JOHN E. BURGHOFF and JOHN B. WILKS, citizens of the United States, residing at Leominster, in the county of Worcester and State of Massachusetts, have invented new and useful Improvements in Comb Embossing and Cutting Dies, of of which the following is a specification.

The invention relates to a comb forming device and more particularly to the class of comb embossing and cutting dies.

The primary object of the invention is the provision of a device of this character in which combs formed from celluloid, rubber or other material may be embossed and cut without the possibility of the finished article being thorned, resultant from irregular cutting by the dies and coöperative punches of the device, thereby rendering neat and smooth finished articles of manufacture.

A further object of the invention is the provision of a device of this character in which a piece of material may be embossed and cut for producing finished combs free from ragged edges or thorned when delivered from the device, the material being acted upon whereby a positive shearing thereof will be attained for the production of complementary combs in a single operation of the said device.

A still further object of the invention is the provision of a device of this character in which the embossing dies are yieldably supported and are adapted to coöperate with similarly shaped punches, the latter being so mounted or supported as to co-act with the said dies for assuring the positive cutting action upon the material interposed therebetween, whereby complementary combs will be cut from such material and embossed without being thorned or presenting irregular contours or surfaces to the finished combs.

A still further object of the invention is the provision of a device of this character which is simple in construction, thoroughly reliable, efficient and easy of operation and inexpensive in manufacture.

With these and other objects in view the invention consists in the construction, combination and arrangement of parts as will be more fully hereinafter described, illustrated in the accompanying drawings and pointed out in the appended claims.

In the drawings:—Figure 1 is a side elevation of a device constructed in accordance with the invention. Fig. 2 is a sectional view on the line 2—2 of Fig. 1. Fig. 3 is a similar view on the line 3—3 of Fig. 1. Fig. 4 is a view similar to Fig. 3, showing the device in position when cutting and embossing a piece of material for the formation of a complementary comb. Fig. 5 is a plan view, looking toward the working face of the punch holder, the punches being in position thereon. Fig. 6 is a similar view, looking toward the working face of the die holder, the dies being in position thereon. Fig. 7 is a perspective view of the embossing dies, the same being shown in separated relation to each other. Fig. 8 is a similar view of the punches.

Similar reference characters are employed to designate corresponding parts throughout the several views of the drawings.

Referring to the drawings by numerals, the device comprises a punch carrying holder or block 10, and a die carrying holder or block 11, one being adapted to approach and retreat from the other when in operation. The punch carrying holder or block has mounted thereon interfitting punches 12 and 13, each being of comb like contour with its teeth projections 14 interfitting similar teeth projections of the adjacent punch. The punch 12 is of a depth or thickness considerably greater than the punch 13 whereby the latter may become displaced with respect to the other punch 12 in the operation of the device, for a purpose as will be hereinafter more fully described.

Formed in the holder or block 10 are counterbores 15, the same being intersected by guide apertures 16 opening through the working face of the block or holder and through which are slidably passed follower pins 17, the latter being provided with heads 18 working in the bores 15. Each follower pin 17 is screw threaded for adjustable engagement with the punch 13, whereby the latter will be fastened to the follower pins. Disposed within the bores 15 are coiled expansion springs 19, each being at one end engaged with the adjacent head of one of the follower pins and has its opposite end bearing against a detachable face plate 20 which is secured to the said holder or block 10, the springs 19 being adapted to yieldably support the punch 13 and normally sustain it in position, whereby its working face will be flush with the working face of the punch 12. The punch 12 is fixedly mounted upon the holder or block 10 by means of detachable screws or bolts 21, the latter being mounted in counterbores 22 provided in the holder or block 10, the bolts or screws 21 being adapted to permit the ready removal of the punch 12 from the holder or block when desired. Supplementing the follower pins 17 are detachable guide pins 23, the latter being mounted in suitable counterbores formed in the block 10 and detachably engaged with punch 13, thus slidably connecting the latter punch upon the punch holder or block. Formed centrally upon the face plate 20 is a lug or stem 24 which latter permits the connecting of the punch holder or block to a plunger rod of a press (not shown).

The die holder or block 11 is provided with oppositely disposed outwardly projecting guide stems 25, the same being engaged in correspondingly shaped guide openings 26 formed in the holder or block 10, thus sustaining the latter in alinement with the die holder or block and guiding it to and from the latter during the operation of the device. This die holder or block 11 is formed with an independent series of spaced counterbores 27 and 28 in which are slidably mounted follower pins 29 each being formed at one end with screw threads so that the said pins will detachably engage the embossing dies 30 and 31, the latter being of considerably lesser depth or thickness than the die 30 and both of these dies are of comb like contour with projecting teeth 32 interfitting each other, the teeth 32 of the dies being in alinement with the teeth projections 14 of the punches so as to register therewith. The follower pins 29 are provided with heads 33 adapted to work in counterbores 27 and against each of which bears one end of an expansion spring 34, the opposite end of which bears against a base plate 35 detachably secured to the die holder or block 11. In the counterbores 28 are mounted detachable stop bolts 36, the latter being in threaded engagement with the dies 30 and 31 and adapted to limit the movement of the dies and also sustain the latter in normal position, whereby their working faces will be flush with each other. The working faces of the dies 30 and 31 are convexed, as at 37, a polish for embossing of the material being interposed between the said dies and the punches and operated upon thereby.

Detachably fitted upon the die holder or block 11 about the dies 30 and 31 is a frame plate 38, the same being provided with a central opening correspondingly shaped to the interfitting dies 30 and 31 in which the latter are disposed. These dies 30 and 31 normally have their working faces flush with the outer surfaces of the frame plate 38, but said dies will retreat or recede from the plate of the outer face of said frame plate 38 on the approach of the punches 12 and 13 for a purpose as will be hereinafter more fully described.

In the operation of the device a strip of material, such as celluloid, rubber or other suitable material is introduced between the dies 30 and 31 and the punches 12 and 13, whereupon the punch holder or block 10 is caused to approach the die holder or block 11, and as the said holder or block 10 moves toward the block 11 the punches 12 and 13 will contact with the material, and on the interfitting relative movement of the dies and punches the said material will be cut and embossed in a complementary manner for producing similarly finished combs.

When the punches 12 and 13 move toward the dies 30 and 31, the punch 12 will displace the die 31, causing it to recede within the opening in the frame plate 38 and below the plane of the working face of the die 31 and simultaneously therewith the die 31 will be displaced or caused to recede in the opening in the frame plate 38 by the punch 13, which latter will also become displaced, but follow the said die 31 into the opening in the frame plate although the die 31 will not recede to a distance within the opening of the frame plate 38 that will bring its working face flush or in a plane with the working face of the die 30, thus it will be evident that on the interfitting of the teeth projections 14 with the teeth projections 32 of the punches and dies, respectively, and the receding of the latter and the simultaneous entering of the punches 12 and 13 in the opening in the frame plate 38 shearing action upon the material will be had for complementary embossing and cutting of the combs. By reason of the positive corelative movement of the punches and the dies the material acted upon will be positively cut without the formation of thorns or the presence of irregular surfaces upon the finished combs when delivered from the device.

From the foregoing it is thought that the construction and mode of operation will be clear and therefore a more extended explanation of the invention has been omitted.

Having thus described the invention what is claimed as new is:—

1. In a device of the class described, a stationary die holder, a punch holder movable toward and away from the said die holder, interfitting comb shaped punches carried by the said punch holder, one of said punches being yieldably supported relative to the other punch, comb shaped embossing dies mounted upon the die holder in alinement with the said punches, and means yieldably supporting the said dies for independent relative movement with respect to each other.

2. In a device of the class described, a stationary die holder, a punch holder movable toward and away from the said die holder, interfitting comb shaped punches carried by the said punch holder, one of said punches being yieldably supported relative to the other punch, comb shaped embossing dies mounted upon the die holder in alinement with the said punches, means yieldably supporting the said dies for independent relative movement with respect to each other, and a frame plate fixed to the die holder and having an opening for receiving said dies and punches.

3. In a device of the class described, a stationary die holder, a punch holder movable toward and away from the said die holder, interfitting comb shaped punches carried by the said punch holder, one of said punches being yieldably supported relative to the other punch, comb shaped embossing dies mounted upon the die holder in alinement with the said punches, means yieldably supporting the said dies for independent relative movement with respect to each other, a frame plate fixed to the die holder and having an opening for receiving said dies and punches, and means for guiding the punch holder toward and away from the die holder.

4. In a device of the class described, a stationary die holder, a punch holder movable toward and away from the said die holder, interfitting comb shaped punches carried by the said punch holder, one of said punches being yieldably supported relative to the other punch, comb shaped embossing dies mounted upon the die holder in alinement with the said punches, means yieldably supporting the said dies for independent relative movement with respect to each other, a frame fixed to the die holder and having an opening for receiving said dies and punches, means for guiding the punch holder toward and away from the die holder, and means for independently adjusting the dies and punches for normally sustaining the same in flushed relation to each other.

5. In a device of the class described, a stationary die holder, a punch holder movable toward and away from the said die holder, interfitting comb shaped punches carried by the said punch holder, one of said punches being yieldably supported relative to the other punch, comb shaped embossing dies mounted upon the die holder in alinement with the said punches, means yieldably supporting the said dies for independent relative movement with respect to each other, a frame fixed to the die holder and having an opening for receiving said dies and punches, means for guiding the punch holder toward and away from the die holder, means for independently adjusting the dies and punches for normally sustaining the same in flushed relation to each other, and means for regulating the first named means.

6. In a device of the class described, a stationary die holder, a punch holder movable toward and away from the said die holder, interfitting comb shaped punches carried by the said punch holder, one of said punches being yieldably supported relative to the other punch, comb shaped embossing dies mounted upon the die holder in alinement with the said punches, means yieldably supporting the said dies for independent relative movement with respect to each other, a frame fixed to the die holder and having an opening for receiving said dies and punches, means for guiding the punch holder toward and away from the die holder, means for independently adjusting the dies and punches for normally sustaining the same in flushed relation to each other, means for regulating the first named means, and means for tensioning the movable punch.

7. In a device of the class described, a stationary die holder, a punch holder movable toward and away from the said die holder, interfitting comb shaped punches carried by the said punch holder, one of said punches being yieldably supported relative to the other punch, comb shaped embossing dies mounted upon the die holder in alinement with the said punches, means yieldably supporting the said dies for independent relative movement with respect to each other, a frame fixed to the die holder and having an opening for receiving said dies and punches, means guiding the punch holder toward and away from the die holder, means for independently adjusting the dies and punches for normally sustaining the same in flushed relation to each other, means for regulating the first named means, means for tensioning the movable punch, one of said punches being of considerably less thickness than the other punch, and one of said dies being of considerably less thickness than the other die, whereby on the approach of the punches relative to the dies the latter will interfit the said punches.

In testimony whereof we affix our signatures in presence of two witnesses.

JOHN E. BURGHOFF.
JOHN B. WILKS.

Witnesses:
FRANCIS L. McMANUS,
JAMES M. HARRINGTON.

---

Copies of this patent may be obtained for five cents each, by addressing the "Commissioner of Patents, Washington, D. C."